Figure 1:
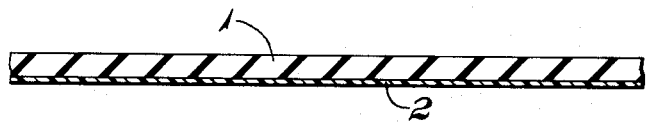

Sept. 29, 1953 T. C. HARPER 2,653,885
TEMPORARY PROTECTION OF UNVULCANIZED RUBBERY SURFACES
Filed Dec. 4, 1950

Inventor
Thomas C. Harper
By Dunleigh S. MacLeur
Atty.

Patented Sept. 29, 1953

2,653,885

UNITED STATES PATENT OFFICE 2,653,885

TEMPORARY PROTECTION OF UNVULCANIZED RUBBERY SURFACES

Thomas C. Harper, Akron, Ohio, assignor to The B. F. Goodrich Company, New York, N. Y., a corporation of New York Application December 4, 1950, Serial No. 199,157

7 Claims. (Cl. 154—46)

1

This invention relates to the protection of the surface of normally tacky bodies and pertains more specifically to a method and means for covering the surface of unvulcanized rubber material until such time as the material is ready for further use or treatment.

Unvulcanized rubber compositions comprising a vulcanizable rubber and compounding ingredients therefor are normally characterized by a somewhat tacky surface, a tackiness which will vary somewhat from one composition to another depending upon the length of time the composition is masticated and the amount of softeners or tackifying agents used in the recipe. In any case, however, the surface of such a composition is somewhat tacky and exhibits pressure-sensitive characteristics so that even the slight pressure caused by laying one thin sheet on top of another will cause the two to adhere together; in addition, foreign material such as dust and dirt readily adheres to such a surface. Accordingly, it is necessary that unvulcanized articles be covered with a suitable protective material during storage.

In the manufacture of complex articles such as tires or hose which are built up from a number of layers of calendered rubber sheet or rubber-coated fabric, the surface tack of the unvulcanized rubber is employed to obtain preliminary adhesion of the various elements prior to vulcanization. In such case, it is essential that the protective material used to prevent adhesion of the surfaces of these elements during storage and before final use be readily removable from the surfaces to leave them clean and tacky, suitable for use in the building operation.

Such materials as parchment paper, holland cloth or similar sheet material have commonly been used as liner layers between sheets of rubbery material, but suffer from the disadvantage that they cannot readily be repaired when torn or damaged. Furthermore, such materials are expensive, in the first instance, and the surface coating frequently flakes off during use and becomes embedded in the rubbery material. It has also been the practice to dust the tacky rubber surfaces with talc, soapstone, mica, or other finely-divided nontacky material, in order to prevent premature and undesired adhesion of the surfaces; however, such material becomes embedded in the rubber composition and cannot readily be removed prior to vulcanization.

It is, therefore, an object of this invention to provide temporary protective means for the exposed tacky surfaces of bodies of unvulcanized rubbery material, which means will adhere to the surface sufficiently to be held in position during storage or shipment but which may be readily stripped from the rubber surface at any desired time to leave the surface in its original condition. It is a further object of the invention to provide covering means which may be used repeatedly and which may be reworked into a usable condition if it becomes torn, damaged or soiled. Other objects will be apparent from the description which follows.

Figure 2:
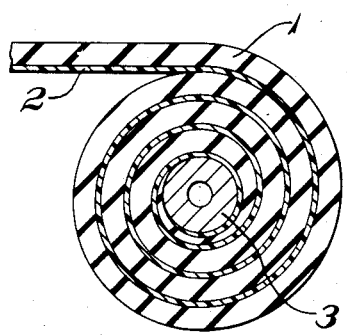
Figure 3:
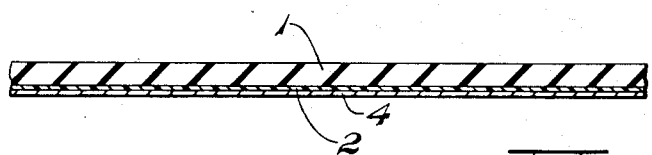

I have discovered that suitable protection for the surface of unvulcanized rubbery material is provided by a continuous relatively thin sheet or film comprising a superpolyamide. Such sheets have tack-free surfaces and are continuous and impervious to dirt, oils, greases and similar contaminants. The superpolyamide films when pressed into contact with a tacky rubber surface adhere thereto but may be readily stripped therefrom without injuring the rubber surface. The superpolyamide sheets may, if they are unsupported (i. e., free from reinforcements such as fabric or paper etc.), be reformed if they become damaged and can thus be used repeatedly. In order to minimize the quantity of superpolyamide required, it is frequently desirable to employ it in the form of a very thin film (about 0.001 inch gauge or less) on a suitable backing or reinforcing sheet, such as textile fabric or heavy paper which serves to provide the requisite strength. When used in the form of an unsupported sheet or film, the superpolyamide material is preferably from 0.001–0.01 inch thick, although the film may be as thick as 0.05 inch or thicker if desired. As shown in the drawing, Figure 1 is a vertical sectional view through a laminate of the present invention wherein 1 designates the mass of vulcanizable rubbery material and 2 represents sheeted nylon. Fig. 2 is a vertical sectional view of a laminate comprising tacky vulcanizable rubber containing a sheet of nylon 2 pressed thereon and wound on an arbor 3 each exposed surface of the rubber being protected. Fig. 3 is a vertical sectional view showing a nylon supported laminate in which rubber base 1 is protected by sheet nylon 2 containing support 4 such as paper.

The superpolyamide preferably used is the ordinary commercial superpolyamide known to the trade as nylon although any of the film-forming superpolyamides including interpolyamides may be used, for example polymeric hexamethylene adipamide. When the superpolyamide is employed as a thin coating on a backing such as paper, it is preferably first dissolved in a suitable volatile solvent such as methyl alcohol or a mixture of methyl alcohol with water; the paper or other backing is then dipped in the solution, or the solution may be applied by spreading, and allowed to dry to deposit a continuous film; if desired, two or more coats may be applied in like manner. The superpolyamide sold as Type 6-B nylon is particularly useful for application from solution. The superpolyamide may contain other compounding ingredients such as fillers, stabilizers, etc., in accordance with known compounding practices.

The film may be used in combination with a body of any normally tacky composition but is preferably used to cover the surface of unvulcanized compositions which include a vulcanizable rubber. Such vulcanizable rubbers include any rubber, whether natural or synthetic, which may be vulcanized by means of sulfur, sulfides, oxides or similar vulcanizing agents. The natural rubbers include, for example, such rubbers as caoutchouc, balata, gutta-percha, and similar naturally occurring rubbers. The synthetic rubbers which may be used include, for example, the rubbery polymers of butadiene-1,3 and similar conjugated dienes, chloroprene, isobutylene, isoprene or similar polymerizable monomers as well as interpolymers of these or similar monomers with each other or with monomers copolymerizable therewith such as styrene, acrylonitrile, methyl acrylate, methyl methacrylate, ethyl acrylate, ethyl methacrylate or similar monomeric materials.

The rubbery composition may include in addition to the vulcanizable rubber, any of the commonly employed compounding ingredients for such rubber in the amounts and proportions commonly employed in rubber compounding practice. Such other ingredients may include, for example, any of the well-known vulcanizing agents and accelerators therefor, antioxidants, fillers, softeners, reinforcing agents, color pigments, etc.

In practising the invention, a sheet or article is formed from the desired vulcanizable composition. A film of superpolyamide adapted to cover the surface extent of the rubbery body is disposed on the body in facewise contact therewith and pressed lightly against the tacky surface of the body causing the film to adhere to the pressure-sensitive surface thereof. In this condition, the unvulcanized articles may be stacked for extended periods of time without adhering to each other or may be shipped without danger of contamination of the surface by dirt or other foreign matter.

When it is desired to process the body of rubbery material further, such as by vulcanization, molding, extrusion, or plying up a number of layers to form a laminated article, the film of superpolyamide is preferably stripped from the surface of the body, leaving the surface intact and in its original tacky condition.

For example, in the case of a sheet of vulcanizable rubber composition or of fabric coated therewith, a superpolyamide-coated paper sheet may be applied to one surface of the material as it comes from the calender. The material may then be rolled upon a drum or other support, the superpolyamide-coated paper serving to separate and prevent adhesion of adjacent rubber surfaces. The coated paper may readily be stripped from the surface of the material as it is unrolled from the drum for further treatment or use. The superpolyamide having a tack-free surface does not tear in stripping from the rubber, nor does it contaminate the rubber surface, and it may generally be used repeatedly without necessity for careful attention.

The superpolyamide film may be used for covering milled or calendered sheets of unvulcanized compositions or may be used in combination with pre-formed articles consisting either partially or wholly of such compositions. For example, the superpolyamide may be used in combination with tire or inner tube patches, adhesive tape, inner tube valves and similar articles where a protective covering for the rubbery surfaces is necessary to prevent contamination until the articles are used.

Although I have herein described specific embodiments of my invention, I do not intend to limit myself solely thereto, but to include all of the obvious variations and modifications within the spirit and scope of the appended claims.

I claim:

1. In combination with an article having an external surface comprising an unvulcanized vulcanizable milled rubber, a relatively thin, unwoven, non-fibrous, flexible and continuous layer comprising a superpolyamide disposed over said surface in face-to-face contact therewith held in place by the surface tack of said article and readily strippable therefrom.

2. In combination, a sheet having opposed surfaces comprising a tacky vulcanizable milled rubber composition and a vulcanizing agent therefor, and a sheet of fibrous material coated with a continuous, relatively thin, unwoven, flexible and non-fibrous layer of superpolyamide disposed in contact with a least one of said surfaces and maintained thereon by the tackiness of said composition but readily strippable therefrom.

3. A body of an unvulcanized tacky composition including vulcanizable natural milled rubber and a vulcanizing agent therefor, said body having at least a portion of its surface protected by a flexible sheet having a continuous, relatively thin, unwoven, flexible and non-fibrous face comprising a superpolyamide disposed in direct contact with said surface and maintained thereon by the tackiness of said composition but readily removable therefrom leaving the surface of said body intact.

4. An article of manufacture comprising a laminate of two intimately contacting separable layers free of an interface layer, one of said layers consisting of a vulcanizable unvulcanized milled rubber having a tacky surface, the other of said layers being adjacent to and held by said tacky surface and consisting of a relatively thin, unwoven, non-fibrous, flexible, continuous sheet of a polyamide selected from the group consisting of superpolyamides and interpolyamides as the essential ingredient and characterized by being readily strippable from said rubber free of adhering particles of rubber.

5. An article of manufacture comprising a laminate of two intimately contacting separable layers free of an interface layer, one of said layers consisting of a vulcanizable unvulcanized solid milled rubber having a tacky surface, the other of said layers being adjacent to and pressed on said tacky surface and consisting of an impervious, unwoven, non-fibrous, unsupported, flexible and continuous superpolyamide sheet from 0.001 to 0.01 inch thick and characterized by being readily strippable from said rubber free of adhering particles of rubber to leave said rubber in its original condition.

6. A body of an unvulcanized tacky composition including a milled vulcanizable rubbery butadiene-1,3 styrene copolymer and a vulcanizing agent therefor, said body having at least a portion of its surface protected by a flexible sheet having a continuous, relatively thin, unwoven, flexible and non-fibrous face comprising a superpolyamide disposed in direct contact with said surface and maintained thereon by the tackiness of said composition but readily removable therefrom leaving the surface of said body intact.

7. In combination, a continuous calendered sheet having opposed surfaces comprising a tacky vulcanizable rubber composition, said sheet being rolled upon itself, and interposed between adjacent surfaces in said roll, a separable continuous flexible sheet having opposed continuous, relatively thin, unwoven, and non-fibrous faces comprising a superpolyamide.

THOMAS C. HARPER.

References Cited in the file of this patent

UNITED STATES PATENTS

| Number | Name | Date |
|---|---|---|
| 2,343,954 | Carlin | Mar. 14, 1944 |
| 2,349,290 | Loughborough | May 23, 1944 |
| 2,419,922 | Tippetts | Apr. 29, 1947 |
| 2,443,486 | Watkins | June 15, 1948 |
| 2,449,180 | Schroeder | Sept. 14, 1948 |
| 2,484,810 | Bacon et al. | Oct. 18, 1949 |
| 2,525,272 | Rhoton | Oct. 10, 1950 |
| 2,541,498 | Calvert | Feb. 13, 1951 |